No. 896,661. PATENTED AUG. 18, 1908.
W. PORTER.
TIRE.
APPLICATION FILED JUNE 26, 1907.
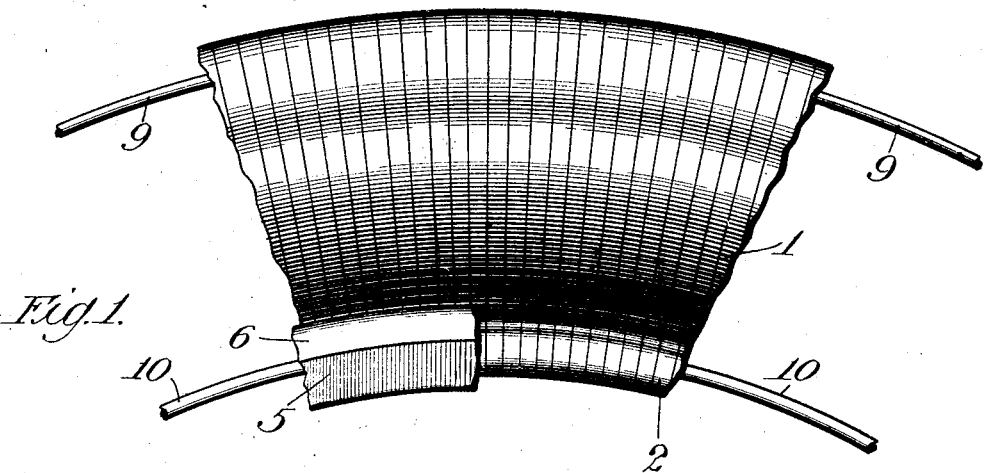
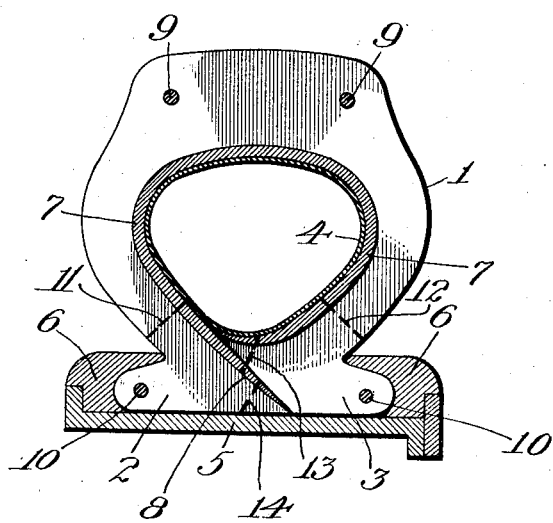
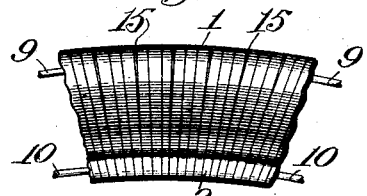
Witnesses:
Inventor:
William Porter
By Townsend, Hauxhatchley & Wright
His Attorneys

UNITED STATES PATENT OFFICE.

WILLIAM PORTER, OF LOS ANGELES, CALIFORNIA.

TIRE.

No. 896,661.　　Specification of Letters Patent.　　Patented Aug. 18, 1908.

Application filed June 26, 1907. Serial No. 380,946.

*To all whom it may concern:*

Be it known that I, WILLIAM PORTER, a citizen of the United States, residing at Los Angeles, in the county of Los Angeles and State of California, have invented a new and useful Tire, of which the following is a specification.

This invention relates to a vehicle tire adapted to be constructed as a pneumatic, cushion or solid tire and preferably formed of leather, and the main objects of the invention are to provide a tire of the character described which is of simple and economical construction and durable in use.

Another object of the invention is to provide a tire wherein the end of the grain of the material constitutes the wearing surface, whereby the durability of the tire and its tractive qualities are greatly increased.

Another object is to construct the tire of a large number of small pieces of material, thereby making it possible for each piece to be of perfect quality, so that the tire as a whole will have no weak places. This also results in considerable economy in construction by reason of it being possible to utilize small pieces of leather unavailable for other purposes, but each in perfect condition.

Other objects and advantages will be brought out in the following description.

The accompanying drawings illustrate the invention, and referring thereto:—Figure 1 is a side elevation of a segmental portion of a tire constructed in accordance with my invention. Fig. 2 is a cross section. Fig. 3 is a view similar to Fig. 1, on a reduced scale, showing a modified form of construction adapted for a tire having a comparatively small diameter.

Briefly, the invention comprises a ring composed of a plurality of radially arranged pieces or plates of leather or other suitable material, the outer edges of the pieces forming the outer wearing surface or tread of the tire, with suitable means for binding or holding the pieces in circular arrangement.

In Fig. 1, 1 designates the pieces or plates composed of leather, or other suitable material. Each piece is preferably slightly tapered or wedge shaped so that its inner edge is narrower than its outer edge, and when the pieces are arranged side by side the faces of the plates will stand radial to the center of the circle formed by the tire. Each piece 1 has a contour of any suitable shape, for example, as shown in Fig. 2, in which the tread portion is somewhat flattened, and the inner edges are formed with wings 2 and 3. In a solid tire each piece 1 would be made solid, but in a pneumatic tire would be cut out at the center, as shown in Fig. 2, to receive the inner air tube 4. The wing portions 2 and 3 are cut apart to form a wedge-shaped opening, as shown, with the cut extending diagonally across a line through the center of the tire, or substantially midway between the wings, whereby comparatively stiff ends are secured and slender strips or flaps are avoided. The lower edges of the wings are straight and flat to conform to the rim 5, and are fastened to the rim 5 in any suitable manner as, for example, by the detachable locking rings 6, as shown. Inside of the annular hole formed in the ring of pieces is a lining 7, formed preferably of leather, which lies between the pieces 1 and the air tube 4 and provides a smooth channel for the air tube, enabling it to be easily inserted or withdrawn, and prevents pinching or abrasion of the air tube against the pieces.

The pieces 1 may be punched out by means of a die and may thus be quickly and economically formed, as for this purpose large perfect pieces of leather are not required. Moreover it is possible to utilize large pieces of leather which might have flaws making them unsuitable for use in other forms of tires and yet provide perfect pieces for this form of tire. Again, small pieces of leather which are useless for any other purpose may be employed to best advantage in this form of tire. This results in great economy of leather, and as the pieces may be rapidly and easily punched with a die their formation is also a most economical process.

The lining 7 has a thin edge 8 which extends into the annular wedge-shaped recess between the wings 2 and 3, while the other edge of the lining 7 may also be tapered and curved over the crack between the wing 3 and edge 8 to form a rounded seat for the air tube and prevent the tube from being forced into the crack between the wings 2 and 3.

In order to hold the pieces in circular arrangement, a pair of wires 9 may be run through the pieces near the tread portions thereof and a similar pair of wire wings 10 may be run through the wings 2 and 3, the rings 10 being of a correspondingly less diameter than rings 9. In order to hold the lining 7 in place it may be stitched at intervals to the pieces 1, as at 11, 12, 13 and 14.

By removing the locking ring 6 the tire may be opened like the ordinary casing of a pneumatic tire to permit of the insertion or removal of the inner tube. A tire thus constructed has great durability and sufficient elasticity and should any part of it become damaged the tire can be repaired by removing the damaged pieces and inserting new pieces in place thereof, and the tire thus repaired not only has the appearance it had before becoming damaged but is restored to exactly the same condition it had before being damaged, whereas in a rubber tire the damaged part has to be vulcanized, often making an unsightly and objectionable protuberance, and the repairing of an ordinary leather tire is quite difficult and unsatisfactory as pieces have to be cemented in place and the tire is not in as perfect condition as before.

The tread portion of this form of tire is made relatively thick to prevent puncture and prolong the wear. The elastic qualities of the tire are equal to any other tire, the bowed portions which are intermediate the thick tread and wings 2 and 3 springing and bulging outward as the tire is compressed and retracting when relieved, the air tube producing the pneumatic sustaining and cushioning qualities.

When the tire has a relatively small diameter, extra wedge-shaped pieces 15 may be riveted at intervals to pieces 1 to avoid having to make the inner edges of pieces 1 very thin, to secure the sharp degree of curve required, as shown in Fig. 3.

What I claim is:—

A tire comprising a hollow ring formed from thin, perforated, wedge shaped pieces of material arranged radially and close together, each piece being cut out in the center and having its inner edge flat and provided with wings, the portion between said wings being separated by a wedge shaped opening extending from the central opening to the flat edge on a diagonal line extending across a line through the center of said piece substantially midway between said wings, a lining around within the tire having thin edges, one of which extends into the wedge shaped recesses of said pieces of material and the other extends across the joint between the other edge of the lining and the inner end of the severed wing portion, wire rings in the perforations of said pieces to bind them together, and an inflatable tube within the tire.

In testimony whereof, I have hereunto set my hand at Los Angeles, California, this 20th day of June 1907.

WILLIAM PORTER.

In presence of—
   GEORGE T. HACKLEY,
   FRANK L. A. GRAHAM.